United States Patent [19]

Nagy

[11] Patent Number: 4,535,861
[45] Date of Patent: Aug. 20, 1985

[54] POWER SOURCE FROM GENERATING CAUSED BY BRAKING ELECTRIC POWERED VEHICLES

[76] Inventor: Janos Nagy, 2600 Monroe St., Hollywood, Fla. 33020

[21] Appl. No.: 489,376

[22] Filed: Apr. 28, 1983

[51] Int. Cl.³ .................. B60K 17/28; B60K 25/00
[52] U.S. Cl. .................. 180/53.5; 180/165; 191/1 R
[58] Field of Search .................. 180/165, 65.3, 53.5; 191/1 R

[56] References Cited

U.S. PATENT DOCUMENTS 4,333,553 6/1982 Hoppie et al. .................. 180/165
4,351,409 9/1982 Malik .................. 180/165

Primary Examiner—Richard A. Bertsch.

[57] ABSTRACT

This power source is created by the motors of an electric vehicle, such as a subway train, because when being braked, its motors become generators, and the current created may be used to heat and pump hot and cold water into tall building structures. Primarily, the power source includes an additional circuit in the vehicle, for take-off of the generated current to a motor driven compressor and an electrically heated boiler. The system also includes a compressed air tank, a group of hot water tanks, and a group of cold water tanks.

1 Claim, 3 Drawing Figures

POWER SOURCE FROM GENERATING CAUSED BY BRAKING ELECTRIC POWERED VEHICLES

This invention relates to power systems, and more particularly, to a power source from generating caused by braking electric powered vehicles.

The principal object of this invention is to provide a power source from generating caused by braking electric powered vehicles, which will be employed for numerous purposes.

Another object of this invention is to provide a power source from generating caused by braking electric powered vehicles, which will serve to employ the electrical energy produced by the vehicle's driving electric motors, when braking is applied to the vehicle, because, during the braking period, the motors still rotating, become electric generators, as is well known in the art.

An average subway train requires 400 to 450 thousand K.W. of electrical energy to achieve cruising speed during the course of each run. The law of conservation of energy predicts that the quantity of energy released by the braking action will equal this amount. Despite losses, which necessarily occur when such energy transformation occurs, the net quantity which is available, is actually enormous. In the prior art, a number of different devices had been introduced to salvage this wasted energy. They were devised to serve such functions as, heating the subway cars in the winter, or recharging batteries. However, none of these proposals efficiently utilized a significant portion of the tremendous quantity of free energy, which is potentially available.

Another object of this invention is to provide a power source from generating caused by braking electric powered vehicles, which will employ a compressed air operated water pumping and water heating system for tall buildings.

A further object of this invention is to provide a power source from generating caused by braking electric powered vehicles, which will be an efficient, effective and practical method for harnessing this energy, which has been heretofore wasted, and certain distinctive features of the compressed air operated water pump and water heating system are as follows:

(1) It functions efficiently, even though the electrical energy required for its use is only available intermittently.

(2) It continues to function efficiently, even though there are wide fluctuations in the quantity of electrical energy which is available at any given time.

(3) It will constantly make full use of the entire quantity of electrical energy available at any given time.

(4) It can eliminate the additional expense, which would ordinarily be required, to pump water to levels above the fourth floor of tall buildings.

(5) It can further diminish, or eliminate completely, the cost of heating the water pumped into tall buildings.

Other objects are to provide a power source from generating caused by braking electric powered vehicles, which is simple in design, inexpensive to manufacture, rugged in construction, easy to use, and efficient in operation.

These, and other objects, will be readily evident, upon a study of the following specification, and the accompanying drawing, wherein.

Figure 1:
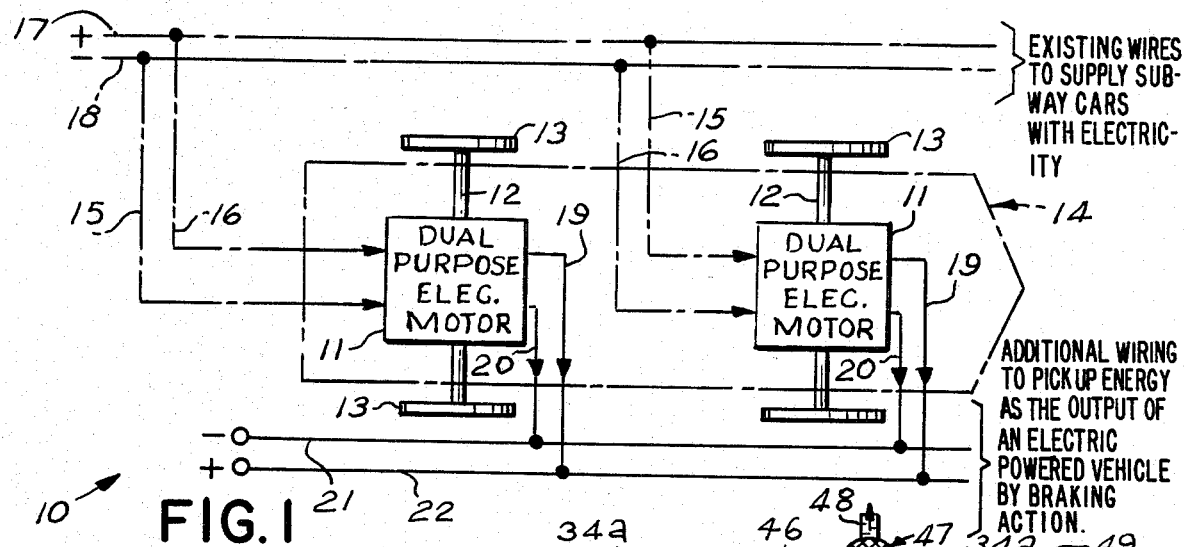
FIG. 1 is a schematic wiring diagram of an electric powered vehicle of the invention.

According to this invention, a power source 10 is shown to include a pair of dual purpose electric motors 11, which serve to drive the axles 12 of the wheels 13 of a subway car 14, or other similar vehicle. A pair of existing current carrying wires 15 and 16 are secured to each of the motors 11, and are connected to the existing feeder wires 17 and 18, which receive current from the power source that operates car 14. A pair of wires 19 and 20 are connected to motors 11 at one end, and are connected to add additional wires 21 and 22, which serve as energy pick-up wires for current generated by motors 11, when braking of car 14 takes place.

Figure 2:
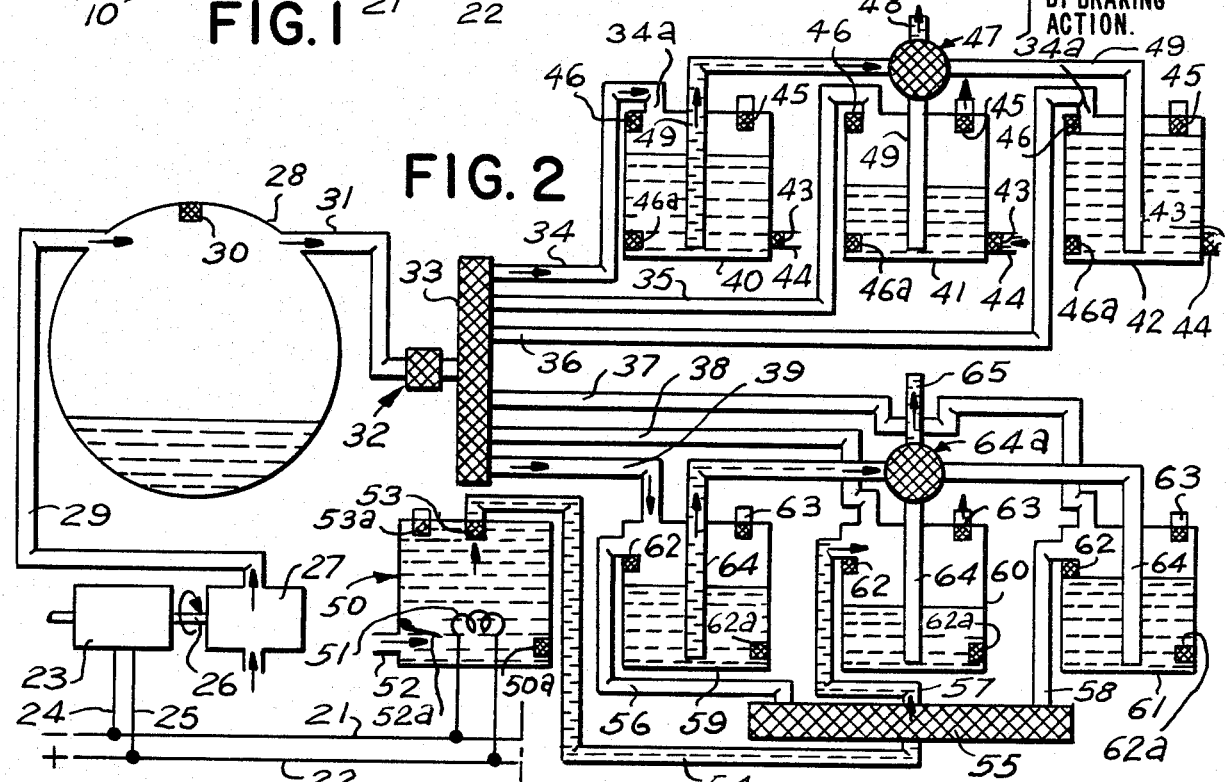
FIG. 2 is a diagrammatic view of the compressed air operated water pumping and heating system of the invention.

Referring now to FIG. 2 of the drawing, an electric motor 23 is connected to wires 21 and 22 by wires 24 and 25, and the shaft 26 of motor 23 is coupled to an air compressor 27, which pumps air under pressure into air tank 28 by input line 29. Tank 28 includes a pressure control switch 30, which is common in the art, and the output line 31, of tank 28, is coupled to a pressure regulator 32 secured to an air distributor 33, which is programmable, one way in, and six ways out, as indicated by air lines 34, 35, 36, 37, 38, and 39. The output ends of lines 34, 35, 36, 37, 38, and 39 are secured in a suitable manner to the upper ends of their respective cold water tanks 40, 41, and 42. Each of the cold water tanks 40, 41, and 42 includes a cold water inlet valve 43 in their inlet lines 44, and a valve 45 is also included in the top of tanks 40, 41, and 42, so as to enable air to leave at the recharging cycle. A water level operated switch 46 is secured in the tops of tanks 40, 41, and 42, and a cold water output selector 47 includes a main cold water output tube 48 at its top, and output tubes 49, of selector 47, extend almost to the bottom on the interior of tanks 40, 41, and 42, respectively.

A boiler or hot water heater 50 includes a heating coil 51 on its interior, which is electrically secured across wires 21 and 22 for current pick-up, when motors 11 are generating, and boiler 50 also includes a cold water input 52, and a one way input valve 52a automatically opens when the boiler 50 needs refilling from the cold water line, and automatically closes when boiler 50 is filled. A thermostat operated valve 53 is secured in its top, within output line 54, which is secured, at its opposite end, to a hot water distributor 55, programmable one way in, and three ways out. A pressure operated safety valve 53a is included in boiler 50, so as to eliminate over-pressure in boiler 50. Lines 56, 57, and 58 from distributor 55, are secured to the upper ends of hot water tanks 59, 60, and 61 respectively, and a water level operated switch 62 is secured within the top of each of the respective hot water tanks 59, 60, and 61. A valve operated opening 63 is also included in the tops of each of the hot water tanks 59, 60, and 61, so as to release air during recharging. A hot water output tube 64 extends almost to the bottoms of the interiors of tanks 59, 60, and 61, and are secured to a hot water output selector 64a, which also has a main hot water output tube 65 at its top end.

It shall be noted, that boiler 50 also includes a water level operated switch 50a, and each of the hot water tanks 59, 60, and 61 includes a water level operated switch 62a, for controlling the lower level of hot water.

It shall be noted, that the cold water tanks 40, 41, and 42 also include a water level operated switch 46a, so as to control the lower level of cold water.

In use, the additional wires 21 and 22 will be brought into numerous tall buildings, and the electricity, generated by the motors 11 of subway cars 14 or the like, is utilized in the following manner:

The incoming wires 21 and 22 conduct the generated electrical current from the motors 11, when the car or cars 14 are being braked, and this current feeds motor 23, which drives compressor 27. The compressed air is fed from compressor 27 into tank 28, by the line 29. The pressure control switch 30 controls motor 23, and the compressed air flows through the output line 31 and into the pressure regulator 32. The pressure regulated air then passes into the air distributor 33, which can be programmed in one fashion for the control at the input of the compressed air, and by six methods for the control of its output.

It shall further be noted, that the heretofore described compressor 27 and water heating system supplies hot, as well as cold water, by using the two different groups of water tanks 40, 41, 42, and 59, 60, and 61. In reference to the cold water tanks 40, 41, and 42, it is necessary to have the three performing in three phases of operation at any one given time.

To provide a continuous supply of cold water the following steps occur:

PHASE I—Tank 40 is supplying now.
(a) Air distributor 33 supplies compressed air via air tube 34, through the cold water tanks opening 34a.
(b) Valve 43 operated water input is closed.
(c) Valve 45 operated opening is closed.
(d) Compressed air forces the water to leave from the tank 40, via output tube 49, into cold water output selector 47.
(e) Cold water selector 47 selects the connection between output tube 49 and main cold water output tube 48.
(f) When the cold water level is low enough to reach the water level operated switch 46a, the latter will cause the next filled tank 42 to become a source of supply. The same switch will cause the empty tank to start to refill.

PHASE II—Tank 41 is refilling now.
(a) Air distributor 33 is closed to the air tube 35.
(b) Valve 43 operated cold water input is open.
(c) Fresh cold water flows into the tank 41.
(d) Valve 45 operated opening for air is open, and allows the remaining air to leave.
(e) When the water level reaches the water level operated switch 46, the valve operated cold water input 43 closes, and the valve operated opening for air is also closed. At this point, the tank 41 reaches phase III (Filled tank ready to supply).

PHASE III—Tank 42 is now ready to supply.
(a) Air distributor 33 is closed to the air tube 36.
(b) Valve 43 operated cold water input is closed.
(c) Valve 45 operated opening for air is closed.

When the water level in the supplying tank, which is in phase I, lowers enough to reach the water level operated switch 46a for the lower level this switch will:
(a) Make the next full tank 42 available for supply.
(b) Bring the empty tank into phase II (Refilling).

SUPPLYING PROCESS:
(a) Opens up air distributors output to air tube 36.
(b) Compressed air then enters, via the water tank 42 opening for air 34a into water tank 42.
(c) Water output selector 47 makes a connection between the water output tube 49 and the main water output tube 48.
(d) Compressed air then forces the water to leave from the tank 42 via the water output tube 49 and the water output selector 47 into the main water output tube 48.

The continuous cycle is as follows:

The first tank is supplying water, the second tank is being refilled and the third tank is completely refilled.

When this system is applied to a system using hot water, instead of cold water, only a relatively minor modification is necessary to provide a water heater unit (boiler) to supply the hot water to a similar system containing three tanks.

NOTE:

The hot water boiler 50 has:
(a) Cold water input 52, to supply the boiler 50 with fresh cold water from the regular water line.
(b) One way input valve 52a automatically opens when the boiler 50 needs refilling from the cold water line, and automatically closes when boiler 50 is filled.
(c) Heating coil 51.
(d) Thermostatically operated valve 53.
(e) Pressure operated safety valve 53a for eliminating over-pressure in boiler 50.
(f) Thermostatically operated switch 50a.

To provide the continuous hot water supply, the following steps occur in four phases as follows:

PHASE I:
(a) Heating coil 51 picks up energy from electric wires 21 and 22.
(b) Required temperature of water opens up the valve 53.
(c) Hot water flows into hot water distributor 55 via hot water output tube 54 of the boiler 50.

NOTE:

Hot water distributor 55 is programmable one way in and three ways out.

PHASE II—Hot water tank 59 is supplying now.
(a) Air distributor 33 supplies compressed air via air tube 39 into hot water tank 59.
(b) Connection between boilers output tube 54 and hot water input tube 56 is closed by hot water distributor 55.
(c) Valve 63 operated opening is closed.
(d) Compressed air forces the hot water to leave from the hot water tank 59, via output tube 64 into hot water output selector 64a.
(e) Hot water selector 64a selects the connection between hot water output tube 64 and main hot water output tube 65.

When the hot water level is sufficiently low to reach the water level operated switch 62a, this switch will cause the next filled tank to become a source of supply. The same switch will cause the empty tank to start to refill.

PHASE III—Hot water tank 60 is recharging now.
(a) Air distributor 33 is closed to the air tube 38.
(b) Valve 63 operated opening is opened, and permits the remaining air to leave.
(c) Connection between hot water output tube 64 and main hot water output tube 65 is closed by hot water line selector 64a.

(d) Hot water distributor 55 connects between hot water output tube 54 and hot water input tube of hot water tank 60.

(e) Hot water flows into hot water tank 60.

NOTE:

In the boiler the water pressure is greater than that in the line which is connected via the cold water input 52.

Since the hot water rises to the upper part of the boiler 50, it will leave via the thermostatically operated valve 53, until the temperature of the water is sufficiently hot to keep valve 53 open. If the water temperature in the boiler exceeds the desired upper limit, the lower part of the boiler's thermostatically operated switch 50a disconnects the heating coil 51 from the electric wire 22 to avoid overheating.

When the hot water level reaches the water level operated switch 62a, this switch will cause the filled tank to go into the phase of supplying hot water.

PHASE IV—Hot water tank 61 is now completely refilled, and is ready to supply.

(a) Air distributor 33 is closed to the air tube 37.

(b) Valve 63 operated opening is closed.

(c) Connection between hot water output tube 64 and main hot water output tube 65 is closed by hot water line selector 64a.

(d) Connection between hot water output tube 54 of the boiler 50 and hot water input tube 58 of hot water tank 61 is closed.

THE CONTINUOUS CYCLE IS AS FOLLOWS:

(a) Water is heated in the boiler, using recovered energy from the braking action of electric motor powered vehicles, and is then automatically switched to the regular pipeline.

(b) The supplying goes on in one tank, the second tank is refilled and the third tank is filled with hot water from the boiler.

At any given time, one tank is supplying hot water from the boiler, a second one has been completely refilled, and a third one is being refilled.

Figure 3:
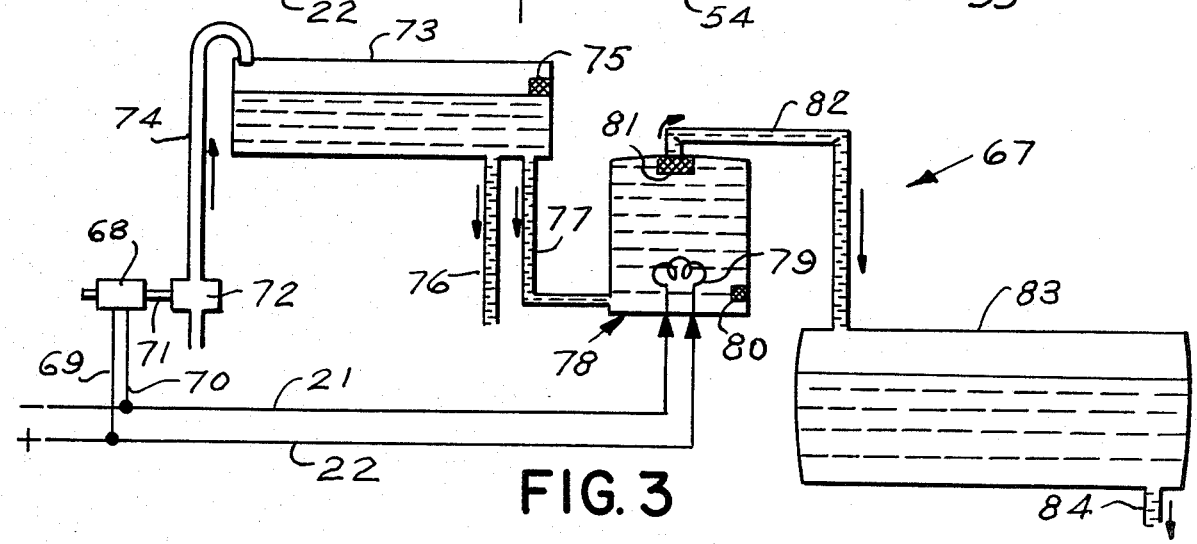
FIG. 3 is a diagrammatic view, showing a modified system of the invention.

Referring now to FIG. 3, a modified system 67 is shown to include a motor 68, which is secured, by wires 69 and 70, to the additional or secondary wires 21 and 22 of car 14, which was heretofore described. Motor 68 is coupled, by its shaft 71, to a water pump 72, that supplies water under pressure to a water tank 73, by line 74. A water level operated switch 75 is included in tank 73, and a pair of bottom lines 76 and 77 are secured to tank 73. Line 77 is secured to the bottom of boiler 78, for feeding water into boiler 78, and the line 76 enables the feeding of water to other water outlets, not shown. A heating element 79 is included in boiler 78, and is connected to wires 21 and 22, and a water level switch 80 is secured in boiler 78, which functions in the same manner as was described of thermostat operated switch 50a of boiler 50. Boiler 78 also includes a thermostat operated valve 81, connected in the output line 82, which extends to the top of a reservoir tank 83, having a bottom water outlet line 84.

In use, the motor 68 drives the pump 72, which feeds water into the tank 73. The water is fed from tank 73, into boiler 78, where it is heated by the coil 79. The heated water of boiler 78 is fed through valve 81 and out of line 82, into the reservoir tank 83, where it is taken off by means of the line 84.

While various changes may be made in the detail construction, it is understood that such changes will be within the spirit and scope of the present invention, as is defined by the appended claims,

I claim:

1. A power source, comprising, in combination, a secondary circuit secured to the electrical motors of an electrically driven vehicle, and a hot and cold water pumping system secured to said secondary circuit; said secondary circuit being secured to the output side of said electrical motors of said electrically driven vehicle; the output side of said secondary circuit being connected to a compressor motor and a thermostatically controlled electric heating coil within a boiler for hot water, and said compressor motor filling a compressed air tank which supplies compressed air to a plurality of hot water tanks and a plurality of cold water tanks, to force hot water and cold water up in a tall building; and programmed valve and switch means whereby when one of said cold water tanks and one of said hot water tanks are in a now water supplying phase, another one of said cold water tanks, and another one of said hot water tanks are in a tank filling phase, and a third of said cold water tanks and a third of said hot water tanks are in a ready to supply phase for a continuous cold and hot water supply.

* * * * *